(12) United States Patent
Katsuda (10) Patent No.: US 7,580,900 B2
(45) Date of Patent: Aug. 25, 2009

(54) INFORMATION APPARATUS, COST MANAGEMENT METHOD, AND COST MANAGEMENT SYSTEM FOR INFORMATION APPARATUS

(75) Inventor: Takeo Katsuda, Tokyo (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 765 days.

(21) Appl. No.: 10/114,106

(22) Filed: Apr. 3, 2002

(65) Prior Publication Data

US 2002/0152184 A1 Oct. 17, 2002

(30) Foreign Application Priority Data

Apr. 13, 2001 (JP) ............... 2001-115783

(51) Int. Cl.
*G06F 17/00* (2006.01)
(52) U.S. Cl. .................................. 705/400
(58) Field of Classification Search ........... 705/400
See application file for complete search history.

(56) References Cited

U.S. PATENT DOCUMENTS

| | | | | |
|---|---|---|---|---|
| 4,578,140 A | * | 3/1986 | Nakajima | 156/384 |
| 5,290,066 A | * | 3/1994 | Mody | 281/15.1 |
| 5,301,122 A | * | 4/1994 | Halpern | 702/62 |
| 5,664,031 A | | 9/1997 | Murai | |
| 5,799,286 A | * | 8/1998 | Morgan et al. | 705/30 |
| 6,052,547 A | * | 4/2000 | Cuzzo et al. | 399/79 |
| 6,158,837 A | * | 12/2000 | Hilton et al. | 347/19 |
| 6,213,600 B1 | * | 4/2001 | Kobayashi et al. | 347/86 |
| 7,158,946 B2 | * | 1/2007 | Sato et al. | 705/26 |
| 2002/0077954 A1 | * | 6/2002 | Slaight et al. | 705/37 |

FOREIGN PATENT DOCUMENTS

| | | |
|---|---|---|
| JP | 05-112061 A | 5/1993 |
| JP | 06-149051 | 5/1994 |
| JP | 07-234578 | 9/1995 |
| JP | 9-212045 A | 8/1997 |
| JP | 11-084963 A | 3/1999 |
| JP | 2000-181306 A | 6/2000 |
| JP | 2000-309147 A | 11/2000 |
| JP | 2001-063189 A | 3/2001 |

OTHER PUBLICATIONS

Nikitas, Theano, "Printers and Scanners (Consumers Are Buying Up Printers and Scanners at a Pace That Is Expected to Continue; Photo-Capable Ink Jet Printers in the Sub-$100-150 Category Are Especially Popular," PTN, May 2000, p. 12+.*

* cited by examiner

*Primary Examiner*—John W Hayes
*Assistant Examiner*—Nathan Erb
(74) *Attorney, Agent, or Firm*—Buchanan Ingersoll & Rooney PC (57) ABSTRACT

An apparatus having a reader for reading expendable item related management information from a recording medium attached to an expendable item, a memory for storing cost information obtained based on the expendable item related management information, and a transmitter for transmitting the cost information stored in the memory.

20 Claims, 7 Drawing Sheets

INFORMATION APPARATUS, COST MANAGEMENT METHOD, AND COST MANAGEMENT SYSTEM FOR INFORMATION APPARATUS

This application is based on Japanese Patent Application No. 2001-115783 filed on Apr. 13, 2001, the contents of which are hereby incorporated by reference.

BACKGROUND OF THE INVENTION

1. Field of the Invention

The invention relates to cost management for information apparatus.

2. Description of the Related Art

Cost management for information apparatus such as a copying machine is customarily done based on cost information calculated from management information such as the number of pages printed.

However, the abovementioned method does not take into account the cost of expendable items such as toner so that the costs of expendable items are not properly reflected upon the cost information. In particular, it is difficult to calculate the cost information accurately as the cost of toner, different from paper, varies with the apparatus used.

Moreover, it is cumbersome and affects productivity to input the management information of expendable items into each individual piece of information apparatus.

SUMMARY OF THE INVENTION

It is an object of the invention to provide accurate and easy management of the cost information of each individual piece of information apparatus.

More specifically, it is an object of the invention to provide an apparatus including a reader for reading expendable item related management information from a recording medium attached to an expendable item, a memory for storing cost information obtained based on the expendable item related management information, and a transmitter for transmitting the cost information stored in the memory.

It is another object of the invention to provide a cost management method including the steps of reading expendable item related management information from a recording medium attached to an expendable item, storing cost information obtained based on the expendable item related management information, and transmitting the cost information as stored.

It is another object of the invention to provide a cost management system including a reader for reading expendable item related management information from a recording medium attached to an expendable item, a processor for calculating cost information based on the expendable item related management information, a memory for storing the cost information, and a transmitter for transmitting the cost information stored in the memory.

The objects, features, and characteristics of this invention other than those set forth above will become apparent from the description given herein below with reference to preferred embodiments illustrated in the accompanying drawings.

DETAILED DESCRIPTION OF THE PREFERRED EMBODIMENT

The embodiments of this invention will be described below with reference to the accompanying drawings.

Figure 1:
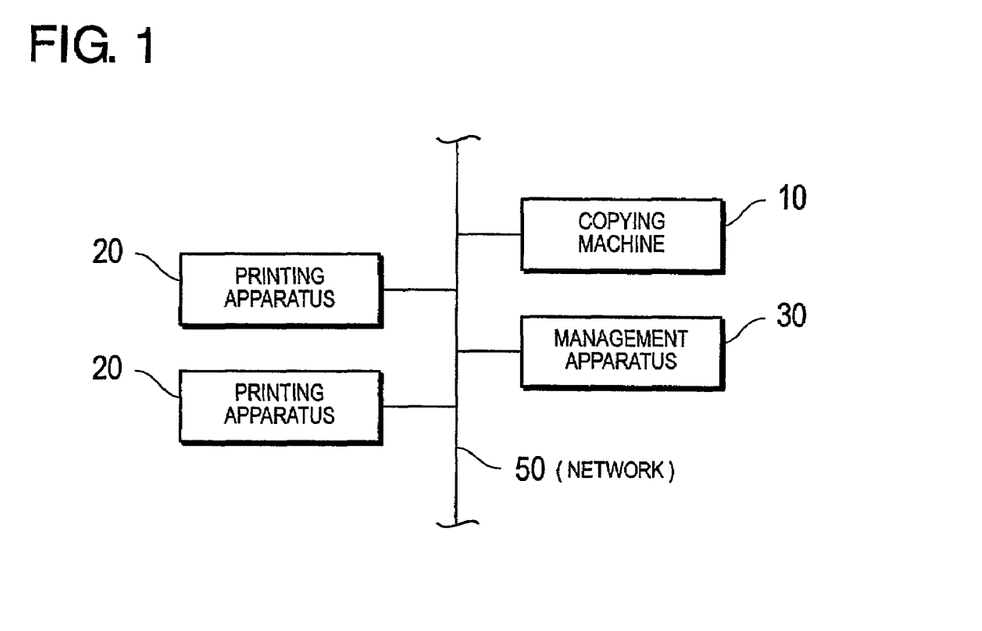
FIG. 1 is a block diagram of a cost management system according to the first embodiment of the present invention.

The cost management system according to the first embodiment includes a copying machine 10, a printing apparatus 20, and a management apparatus 30, all of which are connected to a network 50 as shown in FIG. 1. The network 50 can be a local area network (LAN), a wide area network (WAN), the Internet, or a combination thereof.

Figure 2:
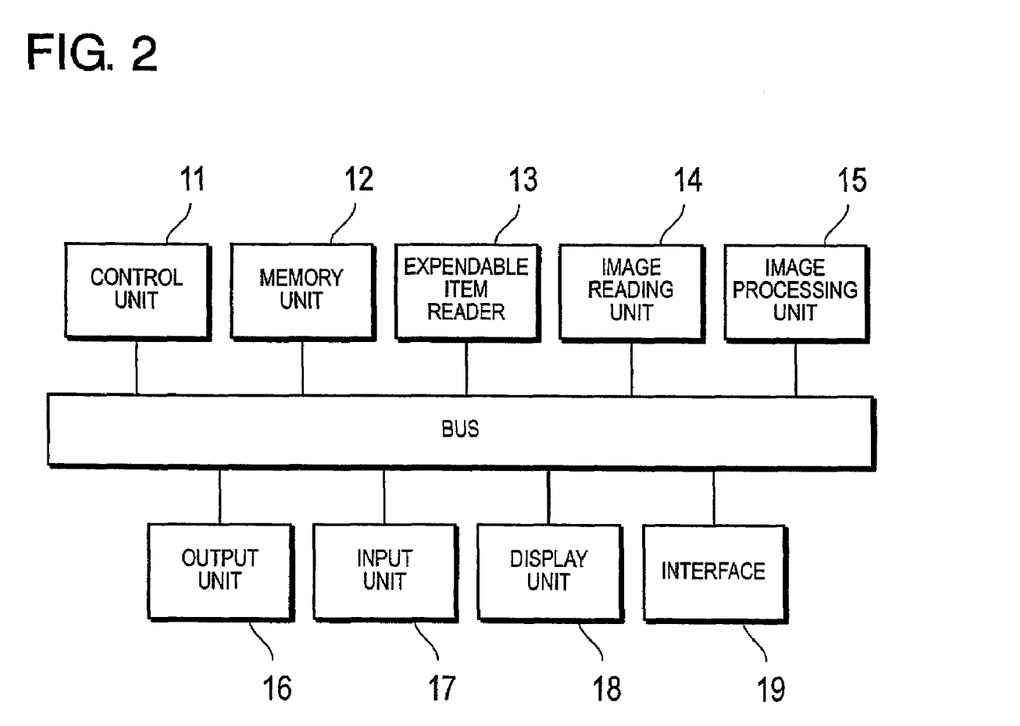
FIG. 2 is a block diagram of a copying machine according to the cost management system.

First, the construction of the copying machine 10 will be described referring to FIG. 2.

The copying machine 10, which is an information apparatus with a function for receiving data via a network 50, includes a control unit 11, a memory unit 12, an expendable item reader 13, an image reading unit 14, an image processing unit 15, an output unit 16, an input unit 17, a display unit 18, and an interface 19, all of which are interconnected via a bus.

The control unit 11 is a central processing unit that controls the parts 12 through 19 in accordance with programs. The programs include a control program for controlling hardware, and an arithmetic program for calculating cost information based on expendable item related management information and apparatus related management information.

The memory unit 12 includes a read only memory device such as a ROM, a high-speed random access memory device such as a RAM, and a large capacity random access memory such as a hard disk drive. The memory unit 12 stores the programs, the apparatus related management information, the cost information, and various setting data, and provides a temporary memory area for storing image data generated from document images and a work area for executing the programs.

Figure 4:
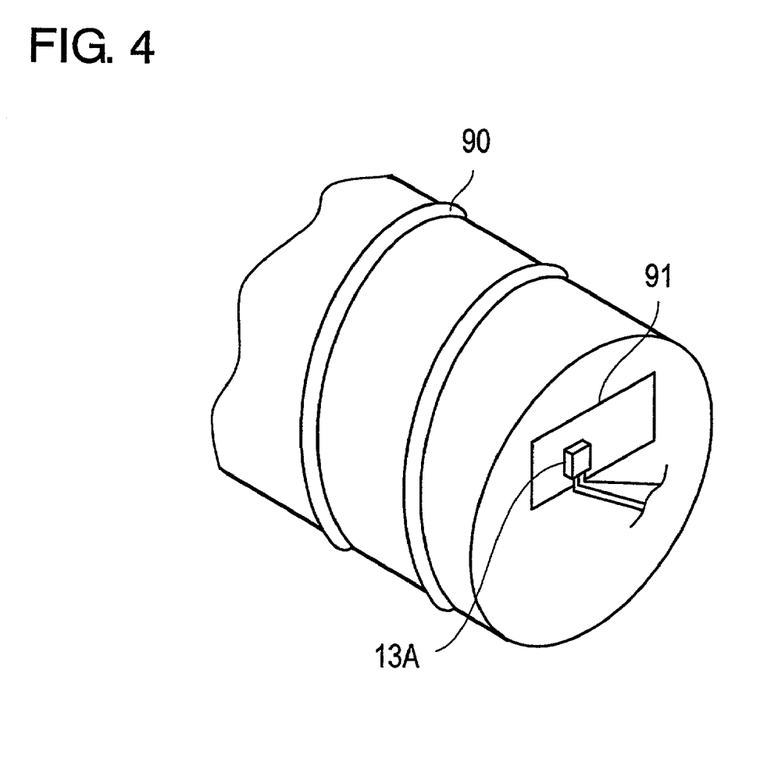
FIG. 4 is a perspective view of assistance in explaining a recording medium attached to an expendable item for a copying machine or a printing apparatus.

The expendable item reader 13 is equipped with a magnetic head 13A for reading the expendable item related management information from a recording medium 91 attached to an expendable item (toner cartridge) 90 as shown in FIG. 4. The recording medium 91 includes a label coated with a magnetic material and indicating the expendable item related management information by the magnetic orientation.

A recording medium can be formed out of a semiconductor memory such as a flash memory or an EPROM. In this case, an expendable item reader 13 has to be equipped with an electronic circuit for reading the expendable item related management information by electrically connecting with the semiconductor memory when the cartridge as an expendable item, is inserted into the machine.

The recording medium can also be formed out of a label on which a mark made of ink corresponding to the expendable item related management information such as a bar code is printed. In this case, the expendable item reader 13 has to be equipped with a sensor for optically detecting the bar code. Moreover, the outside wall of the expendable item can be used instead of a label.

The image reading unit 14 is, for example, a scanner, which is equipped with a CCD (Charge Coupled Device) image sensor for generating image data by reading a document image and an automatic document feeder (ADF) for continuously reading document images.

The image processing unit 15 applies various data processing such as enlargement/reduction processing, and compression/expansion processing to the image data generated in the image processing unit 14. The compression/expansion processing compresses and stores an image data in the memory unit 12 while enlarging the compressed image data read out from the memory unit 12 in synchronization with the timing signal from the output unit 16.

The output unit 16 is an electronic photograph type image forming device, which will be used for outputting image data from the image reading unit 14 on paper. The recording medium, i.e., toner, is stored in a cartridge 90 attached to the output unit 16. The output unit 16 is equipped with a sensor to detect replacement of the cartridge 90.

The input unit 17 has a plurality of keys and a touch panel disposed on a display panel of liquid crystal and is used for inputting the apparatus related management information and various setting items for the copying machine 10.

The apparatus related management information can be prepared on a separate apparatus. For example, a server can transmit the apparatus related management information to the copying machine 10 via a network. Furthermore, a server can merely transmit an update data, or can request the copying machine 10 to receive data for which an updating timing is designated. Alternatively, the apparatus related management information can be provided to the copying machine 10 as data stored in a portable storage medium such as a flexible disk. The display unit 18 is equipped with a light-emitting diode display unit or a liquid crystal display panel and used for displaying various messages.

The interface 19 is a network interface card (NIC) and is used for transmitting the cost information to the management apparatus 30 according to the instruction from the control unit 11.

Figure 3:
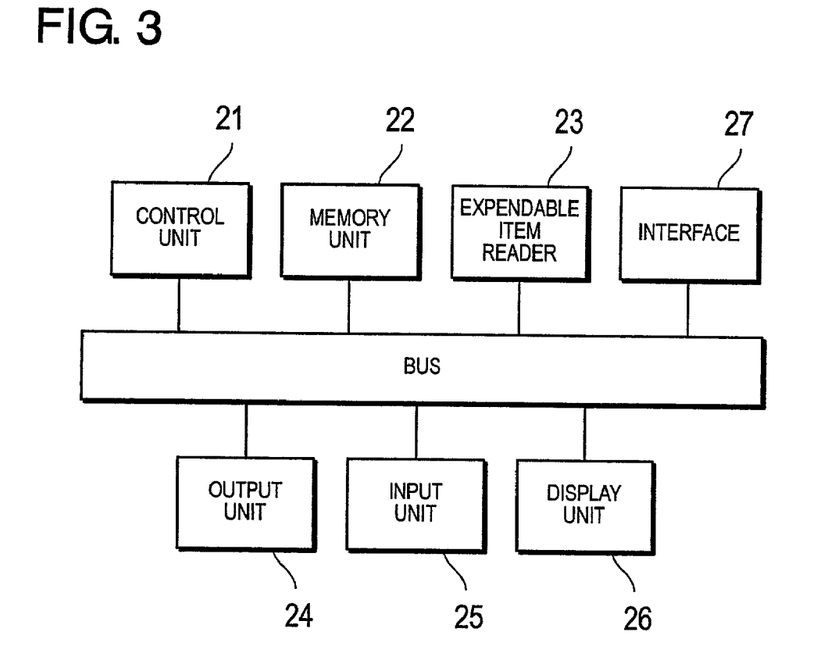
FIG. 3 is a block diagram of a printing apparatus according to the cost management system.

Next, the construction of the printing apparatus 20 will be described referring to FIG. 3.

The printing apparatus 20 is an information apparatus with a capability to exchange data via the network 50 and has a control unit 21, a memory unit 22, an expendable item reader 23, an output unit 24, an input unit 25, a display unit 26, and an interface 27, all of which are interconnected via a bus.

The control unit 21 is a central processing device that controls the parts 22 through 27 according to programs. For example, the programs contain a control program for controlling hardware, a data communication program for receiving printing files inputted through the network 50, and an arithmetic program for calculating cost information based on expendable item related management information and apparatus related management information.

The memory unit 22 includes, for example, a read only memory device such as a ROM, a high-speed random access device such as a RAM, a large capacity random access memory device such as a hard disk drive, etc. The memory unit 22 stores the program, the management information for the apparatus, the cost information, and various setting data while it also has a temporary storage area for storing received printing files and a work area for executing the program.

The expendable item reader 23 is identical to the expendable item reader 13 of the copying machine 10 and is equipped with a magnetic head for reading expendable item related management information from a recording medium attached to an expendable item.

The output unit 24 is an electronic photography type image forming device and is used for outputting a received printing file on paper.

The input unit 25 has a plurality of keys and a touch panel placed on a display panel of liquid crystal and is used for inputting the apparatus related management information and various setting items for the printing apparatus 20.

The display unit 26 has a light-emitting diode display unit and a liquid crystal display panel and is used for displaying various messages.

The interface 27 is a NIC and is used for transmitting the cost information to the management apparatus 30 according to instructions from the control unit 21.

The management apparatus 30 is a computer equipped with a NIC and has a data communication program installed for obtaining the cost information from the information apparatus, i.e., the copying machine 10 and the printing apparatus 20. The management apparatus 30 manages the cost of the entire system based on the received cost information.

Figure 5:
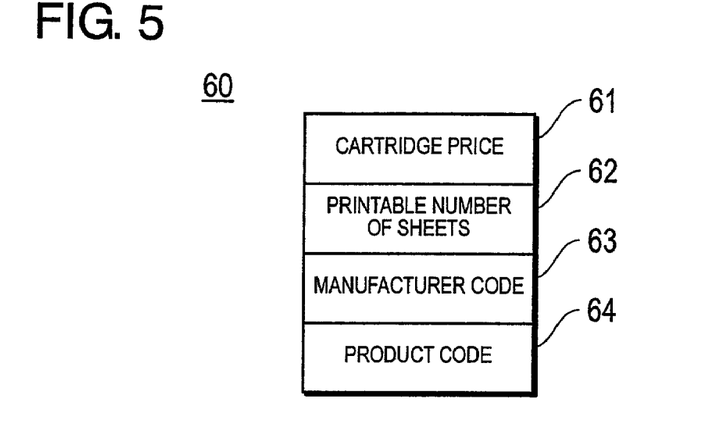
FIG. 5 shows an example of the first information included in expendable item related management information.
Figure 6:
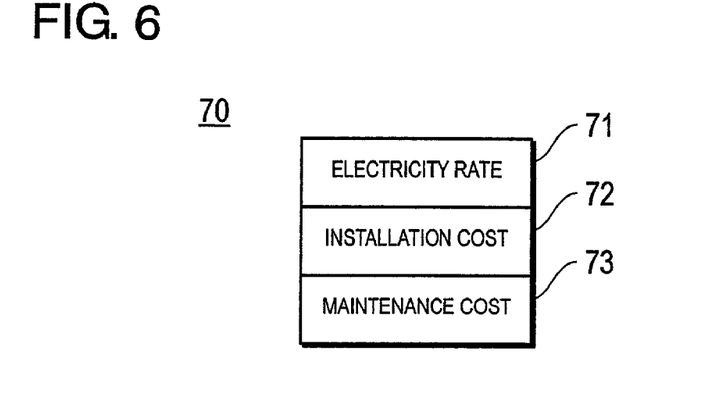
FIG. 6 shows an example of the second information included in management information for a copying machine or a printing machine.
Figure 7:
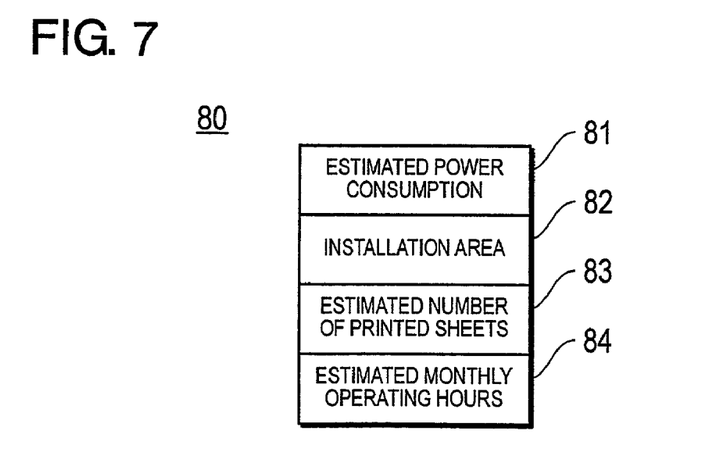
FIG. 7 shows an example of the third information included in management information for a copying machine or a printing machine.

Next, the expendable item related management information read by the expendable item readers 13, 23 and the apparatus related management information stored in the memory units 12, 22 will be described referring to FIG. 5 through FIG. 7.

The expendable item related management information includes the first information 60 that is composed of a toner cartridge (expendable item) price 61, a printable number of sheets (number of sheets on which images can be formed) 62, a manufacturer code 63, and a product code 64. Thus, the first information 60 includes information that is updated approximately every month such as the toner cartridge price 61.

The expendable item price 61 is the price when the item is purchased. The printable number of sheets 62 is the number of sheets that images can be formed for with the amount of the recording medium held in the expendable item (cartridge), and corresponds to the number of sheets by printing characters at a character printing ratio of 5% on A-4 size paper, for example.

The product code 64 is a code for identifying the cartridge. For example, if the first information 60 does not include the toner cartridge price 61, the price can be determined using the product code 64. Furthermore, if the output unit 16 is adapted to color printing and uses a plurality of types of cartridge, the first information 60 contains a plurality of management information 61 through 64.

The apparatus related management information includes the second information 70 that consists of management information that varies in a long term and the third information 80 that consists of management information proper to the apparatus.

Specifically, the second information 70 includes an electricity rate 71 at the location of installation, an installation cost 72 based on the floor space of installation, and a monthly (unit period) maintenance cost 73 to be paid for maintenance of the apparatus. Thus, the second information 70 includes the management information concerned with the location where the information apparatus is installed and the information that is common to the every information apparatus and varies very little.

The installation cost 72 is calculated by dividing the room rent by the floor space required for installation. The installation cost 72 can be obtained by dividing the tax for it by the floor space required for installation.

Furthermore, if the maintenance fee is not fixed but rather varies with the number of sheets, it is possible to calculate the maintenance cost 73 based on the estimated number of printing sheets 83. The estimated number of printing sheets 83 is a forecast value of the number of sheets to be printed per month (unit period), which can be calculated from the actual data of the past.

The third information 80 includes installation area 82, estimated power consumption 81, the above-mentioned estimated number of printing sheets (estimated number of sheets for which images are formed) 83, and an estimated monthly (per unit period) operating hours 84. The estimated power consumption 81 is a forecast value, which can be calculated from the actual data of the past.

Figure 8:
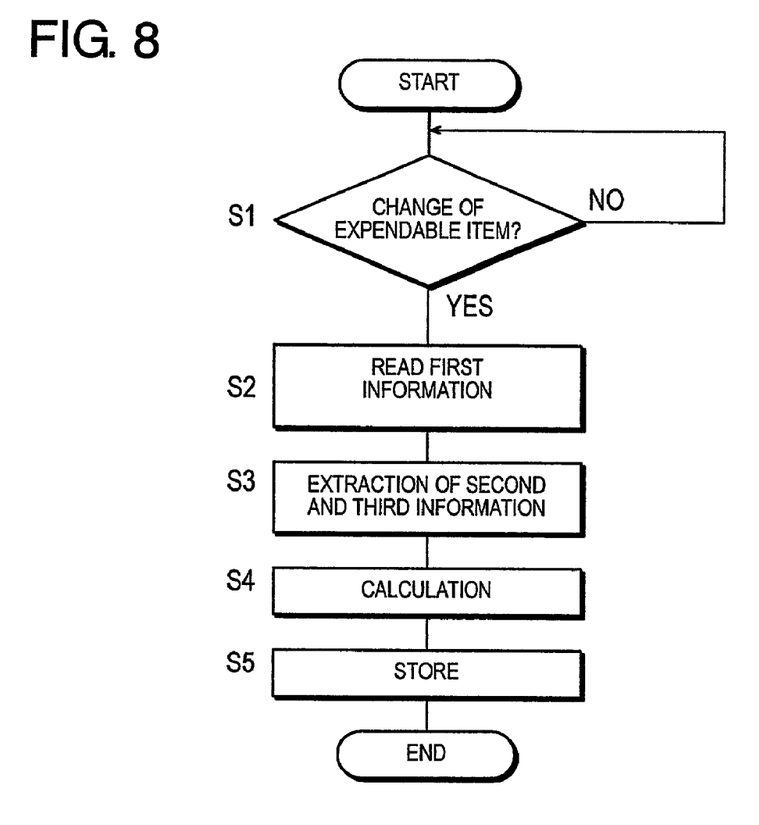
FIG. 8 is a flowchart of the calculation procedure of cost information for a copying machine and a printing apparatus.

Next, the calculation procedure for the cost information to be executed according to the instruction of the control unit in the information apparatus (copying machine 10 and printing apparatus 20) will be described referring to FIG. 8.

First, when the user attaches an expendable item such as a toner cartridge to the information apparatus, the sensor provided on the output unit detects the change of the expendable item (step S1: Yes). Afterward, according to an instruction from the control unit that has noticed the replacement of the expendable item, the magnetic head of the expendable item reader reads the expendable item related management information (the first information) from the recording medium attached to the expendable item, and the expendable item related management information is written into the work area secured in the memory unit (step S2).

Next, the second and the third information stored in the memory unit are extracted and reproduced in the working area of the memory unit in accordance with an instruction by the control unit (step S3). Subsequently, the control unit calculates the cost information based on the first through the third information according to the arithmetic program stored in the memory unit (step S4). The cost information thus obtained is stored in the memory unit (step S5).

The cost information stored in the memory unit is transmitted to the management apparatus 30 via the network 50 as the control unit controls the interface in accordance with a request by the management apparatus 30.

Next, the specific method of calculating the cost information according to the arithmetic program will be described using a case where the cost information is the image forming cost per sheet of paper, i.e., the printing unit cost.

Items of the printing unit cost include the toner (recording medium for image forming) unit cost, electricity unit cost, installation unit cost (unit cost of occupying a space for installation), and maintenance unit cost.

The toner unit cost is calculated by dividing the cartridge price 61 by the printable number of sheets 62. Therefore, if the cartridge price 61 is ¥5000, and the printable number of sheets 62 is 5000, the toner unit cost is ¥1/sheet (=5000/5000).

The electricity unit cost is calculated by dividing by an estimated number of printing sheets 83 a product obtained by multiplying the estimated power consumption 81 by the estimated monthly operating hours 84 and the electricity rate 71. Therefore, if the estimated power consumption 81 is 1 kW, the estimated monthly operating hours 84 is 360 hours (12 hours×30 days), the electricity rate 71 is ¥20/kWh, and the estimated number of printing sheets 83 is 2000 sheets per month, the electricity unit cost is ¥3.6/sheet (=(1×360×20)/2000).

The installation unit cost is calculated by dividing by the estimated number of printing sheets 83 a product obtained by multiplying the installation cost 72 by the installation area 82. Therefore, if the floor area of installation is 50 square meters, the monthly rent is ¥200000, the installation area 82 is one square meter, and the estimated number of printing sheets 83 is 2000 sheets per month, the installation unit cost is ¥2/sheet (=(200000/50)×1/2000).

The maintenance unit cost is calculated by dividing the maintenance cost 73 by the estimated number of printing sheets 83. Therefore, if the maintenance cost 73 is ¥10000 per month and the estimated number of printing sheets 83 is 2000 sheets per month, the maintenance unit cost is ¥5/sheet (=10000/2000).

By adding up those unit costs, i.e., the toner unit cost (¥1/sheet), the electricity unit cost (¥3.6/sheet), the installation unit cost (¥2/sheet), and the maintenance unit cost (¥5/sheet), we get the printing unit cost of ¥11.6/sheet (=1+3.6+2+5).

As can be seen from the above, the management information of the expendable item is automatically obtained and the cost information in consideration of the management information of the expendable item can be calculated in the first embodiment. Therefore, it is possible to accurately and easily manage the cost information of each piece of information apparatus.

Next, the cost management system according to the second embodiment will be described.

Figure 9:
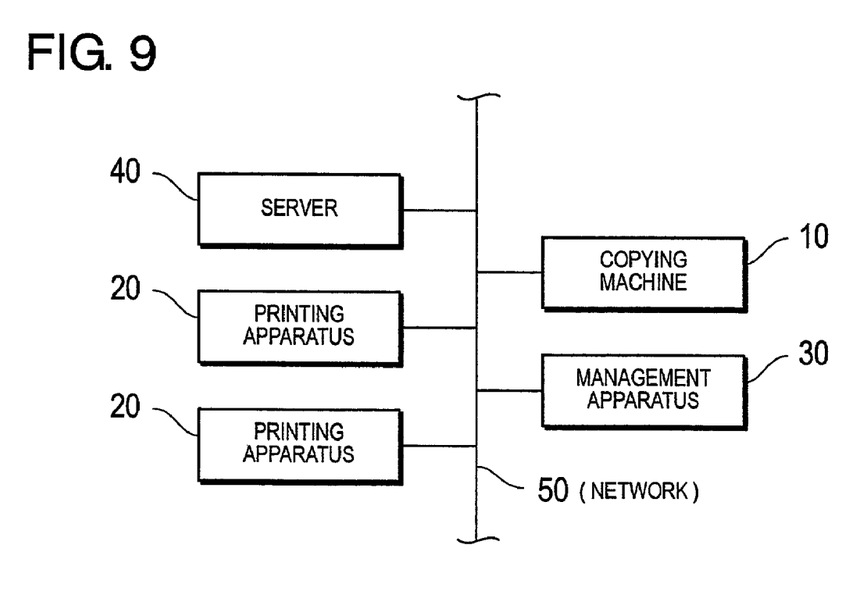
FIG. 9 is a block diagram of a cost management system according to the second embodiment of the present invention.

The cost management system according to the second embodiment is difference from the management system of the first embodiment in the point that the server 40 exists as shown in FIG. 9. The server 40 has a memory unit where the second information that consists of the management information that changes in a long range is stored. Specifically, instead of storing the second information, the information apparatuses 10, 20 store the communication program for receiving the second information from the server 40 in the memory unit.

While the second information contains the management information that is common for the every information apparatus and varies very little, the frequency of changes is higher than the third information that consists of the management information proper to the apparatus. Therefore, in a large scale office where many information apparatuses are set, it is more efficient to manage the second information, collectively. Specifically, by managing the second information by the server 40, it is possible to avoid the cumbersome work of inputting the second information for each piece of information apparatus.

Figure 10:
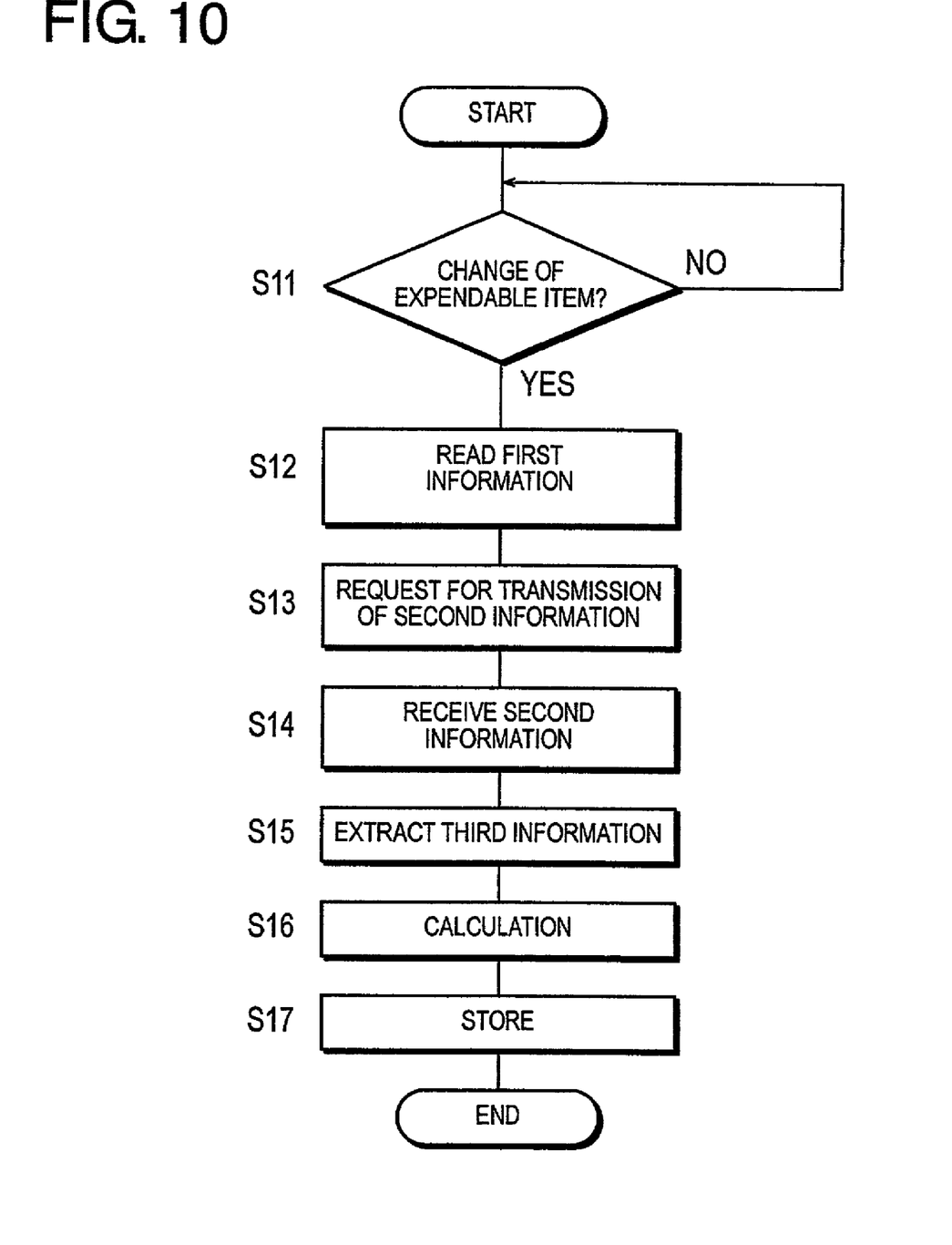
FIG. 10 is a flowchart of the calculation procedure of cost information according to the second embodiment.

Next, the procedure of calculating the cost information according to the instruction of the control unit at the information apparatus 10 and 20 will be described referring to FIG. 10.

First, when the user attaches an expendable item such as a toner cartridge to the information apparatus, the sensor provided on the output unit detects the change of the expendable item (step S11: Yes). Later, in accordance with an instruction from the control unit that has recognized the change of the expendable item, the magnetic head of the expendable item reader reads the expendable item related management information (first information) from the recording medium attached to the expendable item, and the expendable item related management information is written into the work area secured in the memory unit (step S12).

Next, the control unit, in accordance with the communication program stored in the memory unit, controls the interface to request the server 40 to transmit the second information (step S13). Later, the transmitted second information is written into the work area secured in the memory unit (step S14).

Then, the third information stored in the memory unit is extracted in accordance with an instruction of the control unit and reproduced in the working area of the memory unit (step 15).

Subsequently, the control unit calculates the cost information based on the first through the third information according to the arithmetic program stored in the memory unit (step S16). The cost information thus obtained is stored in the memory unit (step S17).

Next, the cost management system according to the third embodiment will be described.

Figure 11:
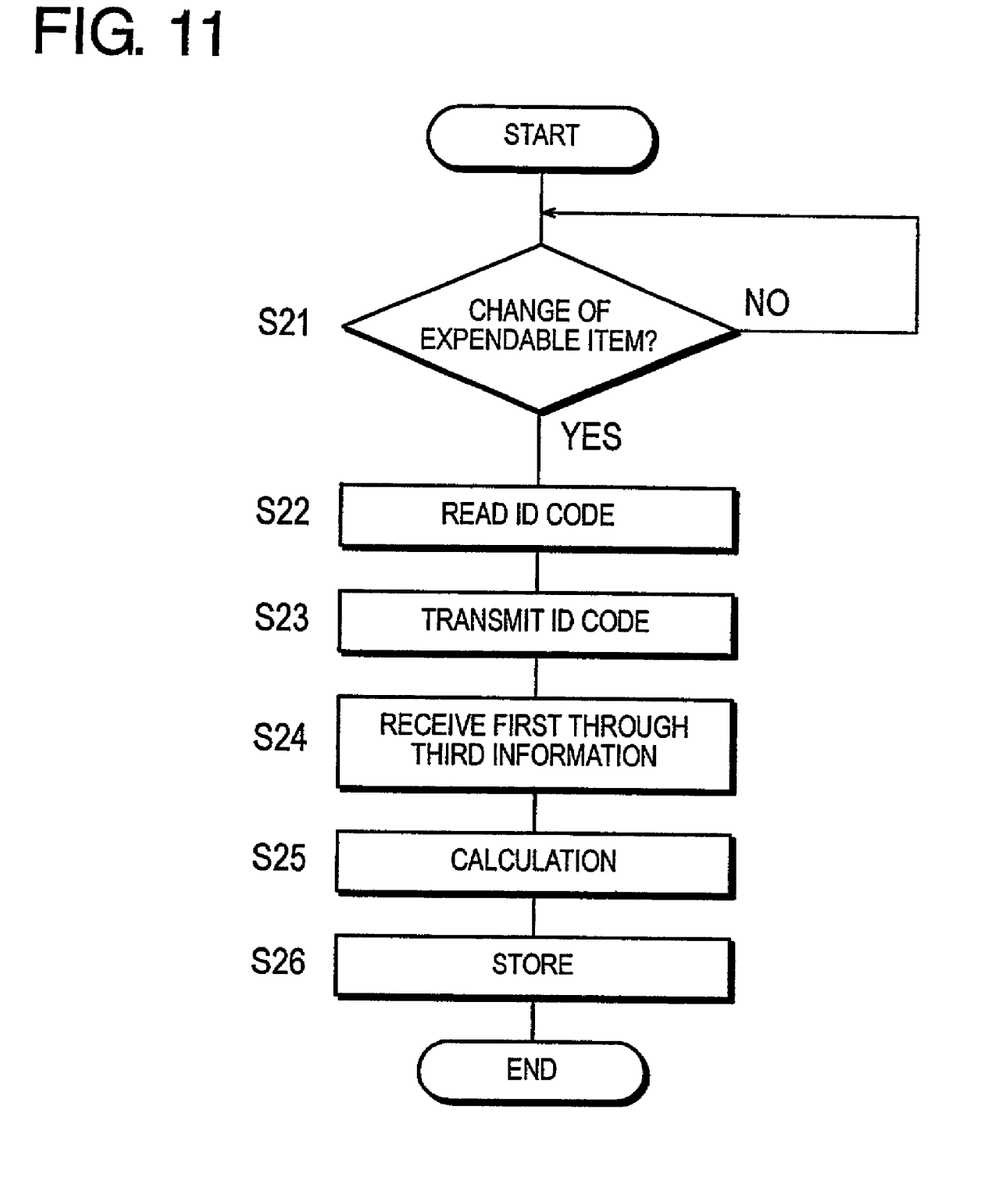
FIG. 11 is a flowchart of the calculation procedure of cost information according to the third embodiment.

The cost management system according to the third embodiment is generally different from the cost management system according to the second embodiment in that the expendable item related management information read from the recording medium is an identification code of the first information and the corresponding relation between the identification code and the first information as well as the first through third information are stored in the server. Thus, the information apparatus does not hold the first through third information.

The identification code has no particular restriction as long as it provides a unique corresponding relation with the first information. For instance, a manufacturer code or a product code can be used for it.

Next, the procedure of calculating the cost information according to an instruction of the control unit at the information apparatus will be described referring to FIG. 11.

First, when the user attaches an expendable item such as a toner cartridge to the information apparatus, the sensor provided on the output unit detects the change of the expendable item (step S21: Yes). Later, in accordance with an instruction for the control unit that has recognized the change of the expendable item, the magnetic head of the expendable item reader reads the expendable item related management information (identification code) from the recording medium attached to the expendable item (step S22).

Next, the control unit, in accordance with the communication program stored in the memory unit, controls the interface to transmit the identification code to the server 40 and requests it to transmit the first through third information (step S23). Next, the first information corresponding to the identification code extracted at the server 40 as well as the second and third information are received, and then written into the work area secured in the memory unit (step S24).

Subsequently, the control unit calculates the cost information based on the first through the third information according to the arithmetic program stored in the memory unit (step S25). The cost information thus obtained is stored in the memory unit (step S26).

Figure 12:
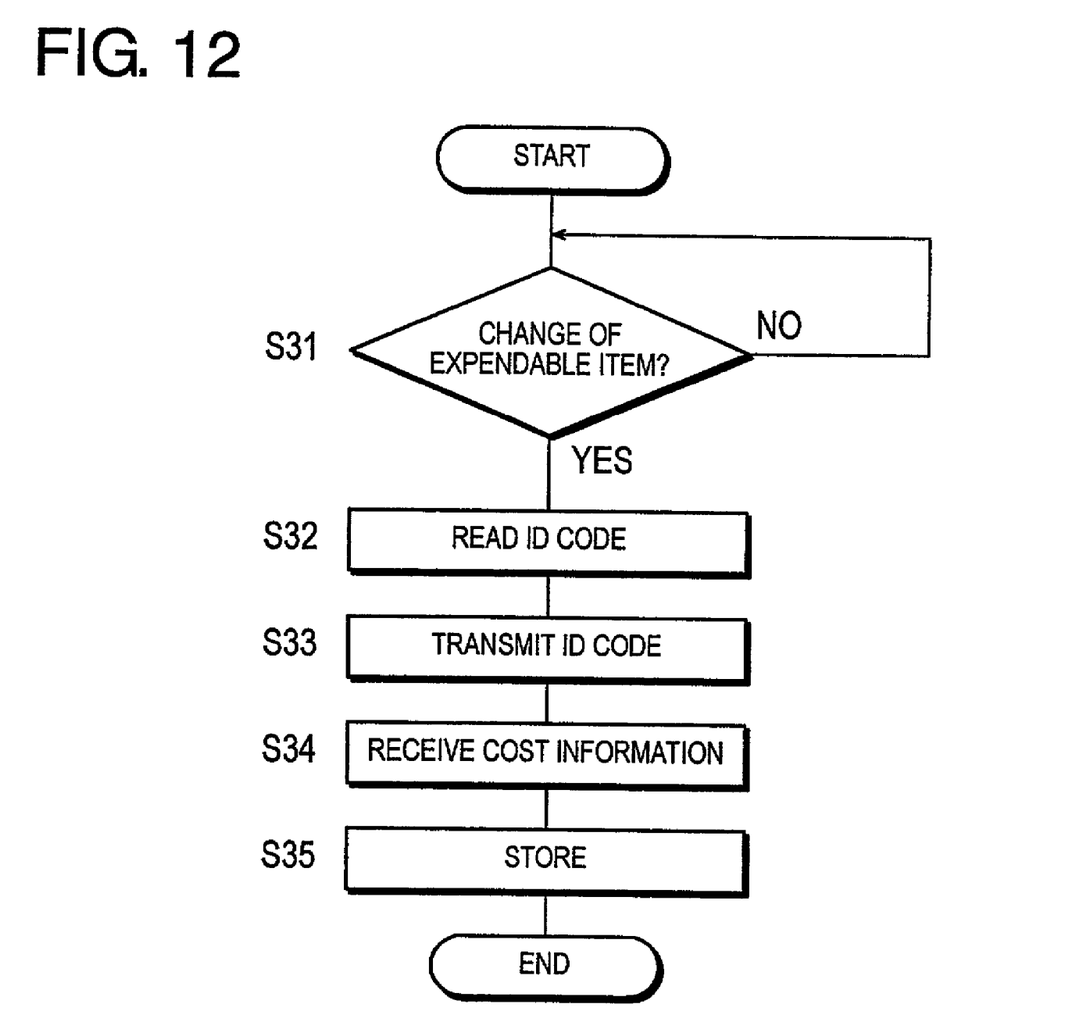
FIG. 12 is a flowchart of the calculation procedure of cost information according to the fourth embodiment.

Next, the cost management system according to the fourth embodiment will be described referring to FIG. 12.

The cost management system according to the fourth embodiment is generally different from the cost management system of the third embodiment in that the cost information is calculated in the server. Specifically, the information apparatus does not have a means of calculating the cost information, while the arithmetic program for calculating the cost information is installed in the server.

The procedure for calculating the cost information executed in accordance with an instruction of the control unit will be described referring to FIG. 12.

First, when the user attaches an expendable item such as a toner cartridge to the information apparatus, the sensor provided on the output unit detects the change of the expendable item (step S31: Yes). Later, in accordance with an instruction for the control unit that has recognized the change of the expendable item, the magnetic head of the expendable item reader reads the expendable item related management information (identification code) from the recording medium attached to the expendable item (step S32).

Subsequently, the control unit, in accordance with the communication program stored in the memory unit, controls the interface to transmit the identification code to the server 40 and requests it to transmit the cost information (step S33). Later, the cost information calculated in the server 40 based on the first information corresponding to the identification code as well as the second and third information is received (step S34). The cost information obtained is stored in the memory unit (step S35).

It is obvious that this invention is not limited to the particular embodiments shown and described above but may be variously changed and modified without departing from the technical concept of this invention.

For example, the cost information can be calculated solely based on the expendable item related management information.

The expendable item to which the recording medium is attached is not limited to a cartridge in which a recording medium for forming image is stored, such as the above-mentioned toner cartridge, or an ink cartridge as in the case of an image forming based on the ink jet method. Thus, it is also possible to attach it to a cartridge in which papers for image forming are held (paper cartridge).

What is claimed is:

1. An apparatus comprising:
    a reader for reading expendable item related management information that includes at least one of price information of an expendable item and information for identifying the price information of said expendable item, from a recording medium attached to said expendable item, wherein the price information is the price of the expendable item when purchased;
    a processor for calculating cost information based on at least one of said price information of said expendable item and said information for identifying the price information of said expendable item;
    a first memory for storing said cost information obtained on the basis of said expendable item related management information;
    a transmitter for transmitting the cost information stored in said first memory; and
    an image forming device for forming an image using the expendable item;
    wherein said expendable item is a cartridge for holding toner, ink, or paper, for image forming; and
    wherein said cost information is an image forming cost.

2. The apparatus as claimed in claim 1, wherein said expendable item related management information is first information including a number of sheets on which images can be formed using the expendable item and the price of the expendable item.

3. The apparatus as claimed in claim 1, wherein said expendable item related management information is an identification code which holds a corresponding relation with first information including a number of sheets on which images can be formed using the expendable item.

4. The apparatus as claimed in claim 1, wherein said cost information is an image forming cost per sheet of paper.

5. The apparatus as claimed in claim 1, wherein said cost information stored in said first memory is obtained based on apparatus related management information in addition to the expendable item related management information.

6. The apparatus as claimed in claim 5, further comprising a second memory for storing apparatus related management information.

7. The apparatus as claimed in claim 6, wherein said apparatus related management information comprises second information including management information that is concerned with a location where the apparatus is installed and that is common to every apparatus and third information including management information proper to the apparatus.

8. The apparatus as claimed in claim 7, further comprising a receiver for receiving the second information from an external device.

9. The apparatus as claimed in claim 7, wherein the image forming device is for forming the image on a paper using the expendable item.

10. The apparatus as claimed in claim 9, wherein said expendable item related management information is first information including a number of sheets on which images can be formed using the expendable item and the price information of the expendable item; said second information comprises an electricity rate, an apparatus installation cost and a maintenance cost; and said third information comprises an apparatus installation area, an estimated power consumption, an estimated number of sheets for which images are formed and estimated operating hours.

11. The apparatus as claimed in claim 1, wherein said recording medium attached to the expendable item is either a semiconductor memory, a label holding a magnetic materal, or a label on which marking is made.

12. The apparatus as claimed in claim 1, wherein said cost information is used to manage the cost of using the apparatus.

13. The apparatus as claimed in claim 12, wherein said cost information relates to a unit cost for operating the apparatus.

14. The apparatus as claimed in claim 1, wherein the cost information relates to the cost of using the apparatus.

15. A cost management method comprising the steps of:
reading expendable item related management information that includes at least one of price information of an expendable item and information for identifying the price information of said expendable item, from a recording medium attached to said expendable item, wherein the price information is the price of the expendable item when purchased;
using a processor to calculate cost information using at least one of said price information of said expendable item and said information for identifying said price information of said expendable item;
storing said cost information obtained on the basis of said expendable item related management information;
transmitting the stored cost information in response to a request from a remote device; and
forming an image using the expendable item;
wherein said expendable item is a cartridge for holding toner, ink, or paper, for image forming; and
wherein said cost information is an image forming cost.

16. The cost management method as claimed in claim 15, wherein said cost information to be stored is obtained based on apparatus related management information in addition to the expendable item related management information.

17. A cost management system comprising:
a reader for reading expendable item related management information that includes at least one of price information of an expendable item and information for identifying the price information of said expendable item, from a recording medium attached to said expendable item, wherein the price information is the price of the expendable item when purchased;
a processor for calculating cost information on the basis of at least one of said price information of said expendable item and said information for identifying the price information of said expendable item;
a memory for storing the cost information;
a transmitter for transmitting the cost information stored in said memory; and
an image forming device for forming an image using the expendable item;
wherein said expendable item is a cartridge for holding toner, ink, or paper, for image forming; and
wherein said cost information is an image forming cost.

18. The cost management system as claimed in claim 17, wherein said processor calculates the cost information based on apparatus related management information in addition to the expendable item related management information.

19. The cost management system as claimed in claim 17 further comprising a management apparatus for receiving the cost information transmitted from said transmitted via a network.

20. The cost management system as claimed in claim 17, wherein said cost information relates to a unit cost for operating the image forming device.

* * * * *